United States Patent Office 2,770,574
Patented Nov. 13, 1956

2,770,574

SELECTIVE ENRICHMENT MEDIUM FOR SALMONELLA

Jacob L. Stokes, El Cerrito, and William W. Osborne, Richmond, Calif., assignors to the United States of America as represented by the Secretary of Agriculture No Drawing. Application June 24, 1955,
Serial No. 517,950

9 Claims. (Cl. 195—100)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the culture of microorganisms and more particularly concerns the culture of microorganisms upon media which preferentially stimulate the growth of Salmonella while inhibiting the growth of other organisms originally present in the microbial specimen being cultured. A particular object of the invention is the provision of media which possess the ability of stimulating the growth of Salmonella and suppressing the growth of other microorganisms. Another particular object of the invention is the provision of a medium which retains the ability to stimulate the growth of Salmonella and to suppress the growth of other organisms, even in the presence of egg material. Further objects and advantages of the invention will be obvious from the description herein.

In order to unequivocally prove the existence of Salmonella in materials, for example dried or frozen egg products, it is necessary to actually isolate the organism in pure culture from among the numerous and varied associated microorganisms originally present in the material under test. Usually to obtain a pure culture of Salmonella, the microbial flora of the material under test is first incubated in an enrichment medium whereby to stimulate growth of Salmonella and suppress growth of other organisms. The resulting culture is then streaked on agar in order to obtain colonies of Salmonella. One type of enrichment broth which is commonly used for such purpose is selenite F broth. This broth contains peptone, lactose, disodium hydrogen phosphate, and sodium selenite. Although the selenite F broth supports good growth of Salmonella and inhibits the development of a variety of accompanying bacteria, it has a number of deficiencies. Thus this medium does not inhibit the growth of Proteus strains and delays the growth of Escherichia strains for only a few hours. Both of these groups of bacteria (Proteus and Escherichia) are commonly found in association with Salmonella strains and are a major source of difficulty in their isolation and identification. Moreover, many strains of Escherichia elaborate antibiotic substances which suppress the growth of Salmonella. Thus where the material originally contains both Salmonella and Escherichia, the former may be eliminated during culture, giving rise to a false negative diagnosis for the presence of Salmonella in the material under test.

We have devised media in which Escherichia and Proteus will not develop and in which luxuriant growth of Salmonella occurs even when the inoculum consists of only one cell per ml. of medium.

The media in accordance with this invention are aqueous solutions containing (a) nutrients which act as sources of carbon, nitrogen and other conventional nutritive principles, (b) growth inhibiting agents, and (c) buffering agent.

Regarding item (a), the media should contain a suitable concentration, on the order of 0.1 to 5%, of the usual bacteria nutritive agents, that is, a carbohydrate, such as sucrose, maltose, fructose, glucose, mannitol, sorbitol, solubilized starch, etc. and a nitrogenous material such as an enzymatic hydrolysate of plant material, animal tissue, casein, albumen or the like. The use of mannitol as the carbohydrate is preferred as this compound is assimilable by Salmonella but is unavailable to all but one species of Proteus, namely P. rettgeri, and therefore the growth of most Proteus strains is not helped by this carbohydrate. Yeast extract is preferably added to the medium to furnish vitamins and other growth factors and trace elements which generally accelerate growth of microorganisms.

Regarding item (b), there is added to the medium a fraction of a percent of an alkali metal selenite and a very small proportion, on the order of 1 to 20 p. p. m., of brilliant-green (color Index No. 662, also known as Malachite green G). These bactericidal agents would by themselves suppress the growth of all organisms so that to counterbalance their strong bactericidal properties, there is added to the medium a minor amount, on the order of 0.05 to 1%, of a bile acid such as taurocholic or desoxycholic acid or a salt thereof. By addition of the bile acid, the properties of bactericidal components are so balanced that the medium will stimulate the growth of Salmonella but suppress the growth of other organisms.

Regarding item (c) there is added to the medium a buffer of the usual type, for example a mixture of alkali metal dihydrogen phosphate and dialkali metal monohydrogen phosphate, whereby to maintain the medium during culture at about neutrality. The buffer prevents development of an alkaline condition during culture which if it took place would lead to inactivation of the antibacterial potency of the selenite.

As demonstrated in Examples I and II below, the medium in accordance with this invention is superior to the known selenite F medium in that it is highly selective in suppressing the growth of Proteus and Escherichia while stimulating the growth of Salmonella. With the use of this medium Salmonella can be isolated from specimens which contain large amounts of miscellaneous organisms and only a few Salmonella cells.

*Example I*

(A) A medium was prepared containing the following ingredients:

Ingredient:

| | | |
|---|---|---|
| Peptone | percent | 0.5 |
| Yeast extract | do | 0.5 |
| Mannitol | do | 0.5 |
| Sodium selenite | do | 0.4 |
| Sodium taurocholate | do | 0.1 |
| Brilliant green | do | 0.0005 |
| Phosphate buffer, pH 7.0 | molar | 0.025 |
| Distilled water (enough to give 100%). | | |

In preparing the medium, the first five ingredients were dissolved in somewhat less than the required amount of water and adjusted to pH 7.0 by addition of a few drops of 5N hydrochloric acid. The phosphate buffer and Brilliant green were then added and the volume of medium adjusted to the designated level with water.

The phosphate buffer was prepared by mixing appropriate quantities of 0.25M solutions of $KH_2PO_4$ and $K_2HPO_4$ to give a solution of pH 7.0 and this was added to the medium in the ratio of 1 part buffer solution to 10 parts medium.

The above medium was dispensed in 9 ml. quantities in a series of test tubes, sterilized by steaming, then each tube was inoculated with a culture of an organism as designated below.

(B) For comparative purposes a series of test tubes each containing 9 ml. of the known selenite F broth were prepared and sterilized. These tubes were inoculated with the organisms set forth below.

The composition of the selenite F broth was as fololws:

| | Percent |
|---|---|
| Peptone | 0.5 |
| Lactose | 0.4 |
| Disodium hydrogen phosphate | 1.0 |
| Sodium acid selenite | 0.4 |

Distilled water to make 100%.

The cell counts of each tube was determined immediately after inoculation and after incubation at 35° C. for 18 hours.

The results obtained are tabulated below:

| Organism | Incubation on known medium (selenite F) | | Incubation on medium of this invention | |
|---|---|---|---|---|
| | Cell count before incubation, cells/ml. | Cell count after incubation, cells/ml. | Cell count before incubation, cells/ml. | Cell count after incubation, cells/ml. |
| Salmonella oranienburg 200E | 2 | 65,000,000 | 1 | 310,000,000 |
| Salmonella typhimurium TM-1 | 2 | 36,000,000 | 1 | 170,000,000 |
| Salmonella anatis 5343 | 1 | 47,000,000 | 2 | 490,000,000 |
| Salmonella pullorum 3083 | 1 | 88,000 | 1 | 88,000 |
| Proteus vulgaris P100 | 95 | 109,000,000 | 116 | 0 |
| Proteus mirabilis P112 | 102 | 20,000,000 | 129 | 30 |
| Proteus rettgeri P113 | 59 | 23,000,000 | 94 | 0 |
| Proteus morganii B540 | | | 111 | 1,800 |
| Escherichia coli 451B | 292 | 3,500,000 | 131 | 0 |
| Escherichia coli 456 | | | 192 | 20 |
| Aerobacter cloacae 460 | 38 | 3,400,000 | 81 | 131,000 |
| Streptococcus faecalis 9790 | | | 121 | 0 |
| Alcaligenes faecalis B170 | | | 163 | 0 |
| Pseudomonas aeruginosa 9627 | | | 85 | 0 |

*Example II*

In order to demonstrate the effect of larger inocula, several organisms were grown on the medium described in Example I (A) using inocula as indicated below. The cultures were incubated for 18 hrs. at 35° C. as in Example I. The results obtained are tabulated below:

| | Cell count before incubation, cells/ml. | Cell count after incubation, cells/ml. |
|---|---|---|
| Salmonella oranienburg 200E | 8 | 510,000,000 |
| Salmonella pullorum 3083 | 36 | 36,000,000 |
| Proteus vulgaris P100 | 11,000 | 120 |
| Proteus vulgaris P100 | 1,100,000 | 19,400 |
| Escherichia coli 451B | 14,300 | 270 |
| Escherichia coli 451B | 1,400,000 | 3,600 |

In the examination of egg materials, such as dried, frozen, or canned whole egg, yolk, or white, for the presence of Salmonella it is necessary to place some of the egg material in the enrichment medium to develop the microbial flora present in the egg material. This gives rise to a complication in that it has been observed that egg material tends to nullify the preferential inhibitory properties of the enrichment medium and thus permit the growth of some non-Salmonella organisms, particularly *Proteus vulgaris*, *Proteus mirabilis*, and *Escherichia coli*.

The powerful effect of egg material in destroying the preferential culture properties of the enrichment medium are demonstrated by the following experimental data.

The organisms *Proteus vulgaris*, *Escherichia coli*, and *Salmonella oranienburg* were each incubated for 18 hrs. at 35° C. on the medium of Example IA. To the medium was also added varying amounts of liquid whole egg as indicated below. The results obtained are tabulated below:

| Percent of liquid whole egg | Cell count after incubation, cells/ml. | | |
|---|---|---|---|
| | Proteus vulgaris | Escherichia coli | Salmonella oranienburg |
| 0 | 0 | 0 | 497,000,000 |
| 0.1 | 490,000 | 0 | |
| 0.3 | 35,700,000 | 410,000 | |
| 1.0 | 136,000,000 | | |
| 3.0 | 279,000,000 | 1,000,000 | |
| 10.0 | 355,000,000 | 2,500,000 | 1,000,000,000 |

It is evident from the above data that the presence of whole egg so stimulates the growth of the Proteus and Escherichia organisms that the preferential culture characteristics of the medium are virtually nullified. It has also been determined that this effect of whole egg in stimulating the growth of Proteus and Escherichia is due mostly to the yolk content of the whole egg; the albumen has the effect of suppressing growth of Salmonella organisms.

It was found that the effect of egg material on the preferential growth characteristics of the enrichment medium can be corrected by adding to the medium a minor amount, on the order of 0.03 to 0.1%, of a sulfa drug such as sulfadiazine, sulfathiazole, sulfasuccidine or sulfapyridine. These compounds have the effect of repressing the growth of non-Salmonella organisms much more than the growth of Salmonella so that as a net result the effect of the egg material is nullified and the sulfa drug-containing medium will cause stimulation of Salmonella and suppression of other organisms. The sulfa drug-containing medium of this invention is therefore useful for isolating Salmonella organisms from egg products of all kinds whether they contain yolk, white, or both yolk and white. It has been found experimentally that the sulfapyridine-containing medium is selective enough to permit isolation of Salmonella from naturally contaminated egg products and that it is sensitive enough to permit isolation of Salmonella even when originally present in the proportion of one viable cell in 100 grams of egg material.

The effectiveness of the sulfa drug-containing medium is demonstrated in the following examples:

*Example III*

In these experiments, samples of the medium described in Example IA, as such, and with added sulfapyridine, were inoculated with *Salmonella typhimurium*, *Proteus vulgaris*, and *Escherichia coli*. In all cases, to the cultures was added 4% liquid whole egg. The cultures were incubated 18 hours at 35° C. then cell counts were taken. The results are tabulated below:

| Concentration or sulfapyridine, percent | Cell counts after incubation, cells/ml. | | |
|---|---|---|---|
| | Salmonella typhimurium | Proteus vulgaris | Escherichia coli |
| 0 | 1,300,000,000 | 320,000,000 | 310,000 |
| 0.03 | 600,000,000 | 430,000 | 600 |
| 0.05 | 86,000,000 | 21,000 | 90 |
| 0.07 | 1,800,000 | 2,400 | 60 |

*Example IV*

A medium was prepared containing the following ingredients:

Ingredient:
- Peptone _____percent__ 0.5
- Yeast extract _____do____ 0.5
- Mannitol _____do____ 0.5
- Sodium selenite _____do____ 0.4
- Sodium taurocholate _____do____ 0.1
- Brilliant green _____do____ 0.005
- Phosphate buffer, pH 7.0 _____molar__ 0.025
- Sodium sulfapyridine _____percent__ 0.05
- Distilled water (enough to make 100%).

In preparing the medium, the first five ingredients were dissolved in somewhat less than the required amount of water and adjusted to pH 7.0 by the addition of a few drops of 5 N hydrochloric acid. The phosphate buffer, Brilliant green, and sodium sulfapyridine were then added and the volume of medium adjusted to the designated level with water.

The phosphate buffer was prepared by mixing appropriate quantities of 0.25 M solutions of $KH_2PO_4$ and $K_2HPO_4$ to give a solution of pH 7.0 and this was added to the medium in the ratio of 1 part of buffer to 10 parts medium.

The above medium was dispensed in 9 ml. quantities in a series of test tubes, sterilized by steaming, then each tube was inoculated with a culture of a microorganism as designated below. Also to each tube was added 10% of liquid whole egg. The cell counts of each tube was determined immediately after inoculation and after incubation for 18 hours at 35° C.

The results are tabulated below:

| Organism | Cell count before incubation, cells per ml. | Cell count after incubation, cells per ml. |
|---|---|---|
| Salmonella senftenberg 775W | 18 | 730,000,000 |
| Salmonella senftenberg FDA | 21 | 990,000,000 |
| Salmonella oranienburg 6266 | 16 | 7,000,000 |
| Salmonella meleagridis 5485 | 17 | 1,600,000,000 |
| Salmonella paratyphi B76 | 14 | 1,200,000,000 |
| Salmonella pullorum 3259 | 13 | 40,000 |
| Salmonella pullorum 1430 | 11 | 100,000 |
| Escherichia coli 2010 | 910 | 3 |
| Escherichia coli 2011 | 1,030 | 0 |
| Aerobacter aerogenes 2111 | 1,220 | 135,000 |
| Aerobacter aerogenes 2001 | 1,770 | 14 |
| Proteus vulgaris X19 | 930 | 5,300 |
| Bacillus cereus | 7 | 0 |

*Example V*

This example demonstrates the ability of the medium of this invention to preferentially stimulate the growth of Salmonella in the presence of large numbers of other organisms.

Four samples of liquid egg obtained from an egg-breaking line had microbial counts which ranged from 48,000 to 468,000 bacteria per ml. One ml. of each sample was added to tubes containing 9 ml. of the medium of Example IV and inoculated with approximately 10 cells of *Salmonella typhimurium* contained in 1 ml. of water. After overnight incubation, these enrichment cultures were streaked on agar plates. *Salmonella typhimurium* was recovered in all instances as judged by the nature of the growth on Brilliant green agar, by microscopic examinations and also by agglutination tests with group specific antisera.

Having thus described the invention, what is claimed is:

1. A medium which stimulates the growth of Salmonella and suppresses the growth of other microorganisms comprising water, nutritive materials, and the following ingredients in the approximate concentrations set forth below:

- Alkali-metal selenite _____percent__ 0.1 to 1.0
- Brilliant green _____ppm__ 1 to 20
- At least one member of the group consisting of taurocholic acid, desoxycholic acids and the salts thereof _____percent__ 0.05 to 1

2. A method for multiplying the Salmonella content of a microbial specimen while suppressing multiplication of other microorganisms present in the specimen which comprises culturing the specimen on the medium of claim 1.

3. A medium which stimulates the growth of Salmonella and suppresses the growth of other microorganisms comprising the following ingredients in the approximate concentrations set forth below:

- Sodium taurocholate _____percent__ 0.1
- Peptone _____do____ 0.5
- Yeast extract _____do____ 0.5
- Mannitol _____do____ 0.5
- Sodium selenite _____do____ 0.4
- Brilliant green _____do____ 0.005
- Phosphate buffer, pH 7.0 _____molar__ 0.025
- Water—Sufficient to make 100%.

4. A method for multiplying the Salmonella content of a microbial specimen while suppressing multiplication of other microorganisms present in the specimen, which comprises culturing the specimen on the medium of claim 3.

5. A medium which stimulates the growth of Salmonella and suppresses the growth of other microorganisms and which is effective in the presence of egg material, comprising water, nutrient material, and the following ingredients in the approximate concentrations set forth below:

- Alkali-metal selenite _____percent__ 0.1 to 1
- Brilliant green _____ppm__ 1 to 20
- At least one member of the group consisting of taurocholic acid desoxycholic acid and the salts thereof _____percent__ 0.05 to 1
- At least one member of the group consisting of sulfadiazine, sulfathiazole, sulfasuccidine and sulfapyridine _____percent__ 0.03 to 0.1

6. A method for multiplying the Salmonella content of a microbial specimen containing egg material while suppressing multiplication of other microorganisms present in the specimen, which comprises culturing the specimen on the medium of claim 5.

7. A medium which in the presence of egg material stimulates the growth of Salmonella and suppresses the growth of other microorganisms comprising the following ingredients in the approximate concentrations set forth below:

- Sodium taurocholate _____percent__ 0.1
- Peptone _____do____ 0.5
- Yeast extract _____do____ 0.5
- Mannitol _____do____ 0.5
- Sodium selenite _____do____ 0.4
- Brilliant green _____do____ 0.005
- Sulfapyridine _____do____ 0.05
- Phosphate buffer, pH 7.0 _____molar__ 0.025
- Water—Sufficient to make 100%.

8. A method for multiplying the Salmonella content of a microbial specimen containing egg material while suppressing multiplication of other microorganisms present in the specimen, which comprises culturing the specimen on the medium of claim 7.

9. A method for correcting the cultural properties of an enrichment medium which normally stimulates the growth of Salmonella and suppresses growth of other microorganisms but which in the presence of egg material loses such preferential growth characteristics, which comprises adding to the medium a fraction of a percent of sulfapyridine.

References Cited in the file of this patent

Levinet et al.: A Compilation of Culture Media, 1930, Williams and Wilkins, Baltimore, page 569.

Porter: Bacterial Chemistry and Physiology, 1946, Wiley, pp. 310–311, 329.

Baltimore Biological Laboratory: Culture Media, Materials and Apparatus for the Bacteriological Laboratory, 1640 Gorsuch Avenue, Baltimore 18, Maryland, 1948, pp. 44, 45, 82, 83.

Difc. Manual: 9th ed., 1953, Difc. Laboratories, Detroit 1, Michigan, pp. 144, 145, 158, 159.